(No Model.)

S. A. MARKER.
RIVET FOR BELTS, &c.

No. 251,788. Patented Jan. 3, 1882.

Witnesses
Chas H. Smith
J. Hail

Inventor
Stephen A. Marker
for Lemuel W. Serrell
atty

UNITED STATES PATENT OFFICE.

STEPHEN A. MARKER, OF HARTFORD, ASSIGNOR TO HOLMES, BOOTH & HAYDENS, OF WATERBURY, CONNECTICUT.

RIVET FOR BELTS, &c.

SPECIFICATION forming part of Letters Patent No. 251,788, dated January 3, 1882.

Application filed October 3, 1881. (No model.)

*To all whom it may concern:*

Be it known that I, STEPHEN A. MARKER, of Hartford, in the State of Connecticut, have invented an Improvement in Rivets for Belts, Leather, &c., of which the following is a specification.

Eyelets and rivets have been made with an edge that is pressed into the material or fabric that is clamped by it, and in some instances teeth have been employed upon the edge of the rivet head or washer to enter into the leather. In all such cases the surface of the material and the end of the rivet are not smooth; but, on the contrary, there is an annular depression in the leather around the rivet-head. Rivet heads and washers have been made conical, in order that the edge of the head may fill up the depression in the leather and form a smooth surface. At the same time the rivet is stronger at the junction of the head and body. The conical rivet-heads, however, do not grasp the surface of the leather, and the conical head may pull out of the leather.

My present invention is for giving to the conical-headed rivet and washer a greater hold on the leather or fabric without interfering with the other recognized qualities of the rivet.

Figure 1:
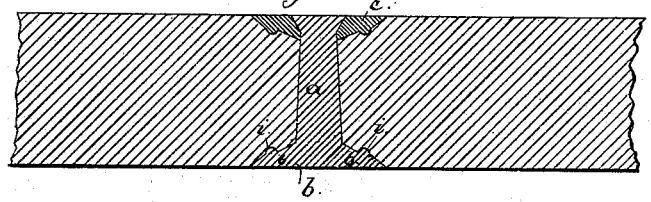
Figure 2:
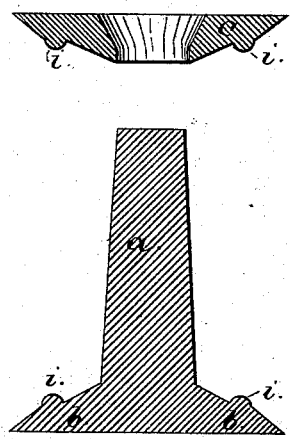
Figure 3:
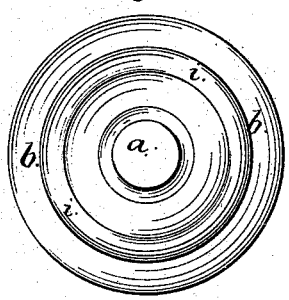

In the drawings, Figure 1 is a section of a rivet and washer as placed in the leather. Fig. 2 shows the section in larger size of a rivet and washer separately, and Fig. 3 is a plan of the rivet.

The shank or body $a$ is conical, and the head $b$ has its inner surface conical and its outer end flat, or nearly so. The washer $c$ is similarly shaped to the head, and provided with a hole for the shank to pass through.

My special feature of improvement consists in corrugations or projections upon the conical inner surface of the head or washer, or both, which projections, entering the leather or fabric clamped by the rivet, increase the extent of the material held by such rivet and insure greater strength of connection. I prefer and use the annular ribs $i$ upon such conical surfaces, the same being placed about midway between the shank and the edge of the rivet. At this place the conical portion of the head is sufficiently strong to insure the embedding of the rib in the leather or fabric as the parts are riveted up. The rib may be shaped differently or the projections placed nearer to or farther from the shank.

I claim as my invention—

The conical-headed rivet or washer having a flat outer end surface having a rib or projections on the conical surface for the purposes and as set forth.

Signed by me this 27th day of September, A. D. 1881, at Hartford, Connecticut.

STEPHEN A. MARKER.

Witnesses:
W. J. MCCONVILLE,
ROBERT LOMAX.